July 19, 1938.  W. F. GROENE ET AL  2,124,347
CENTER DRIVE CAMSHAFT LATHE
Filed Jan. 21, 1937  10 Sheets-Sheet 5
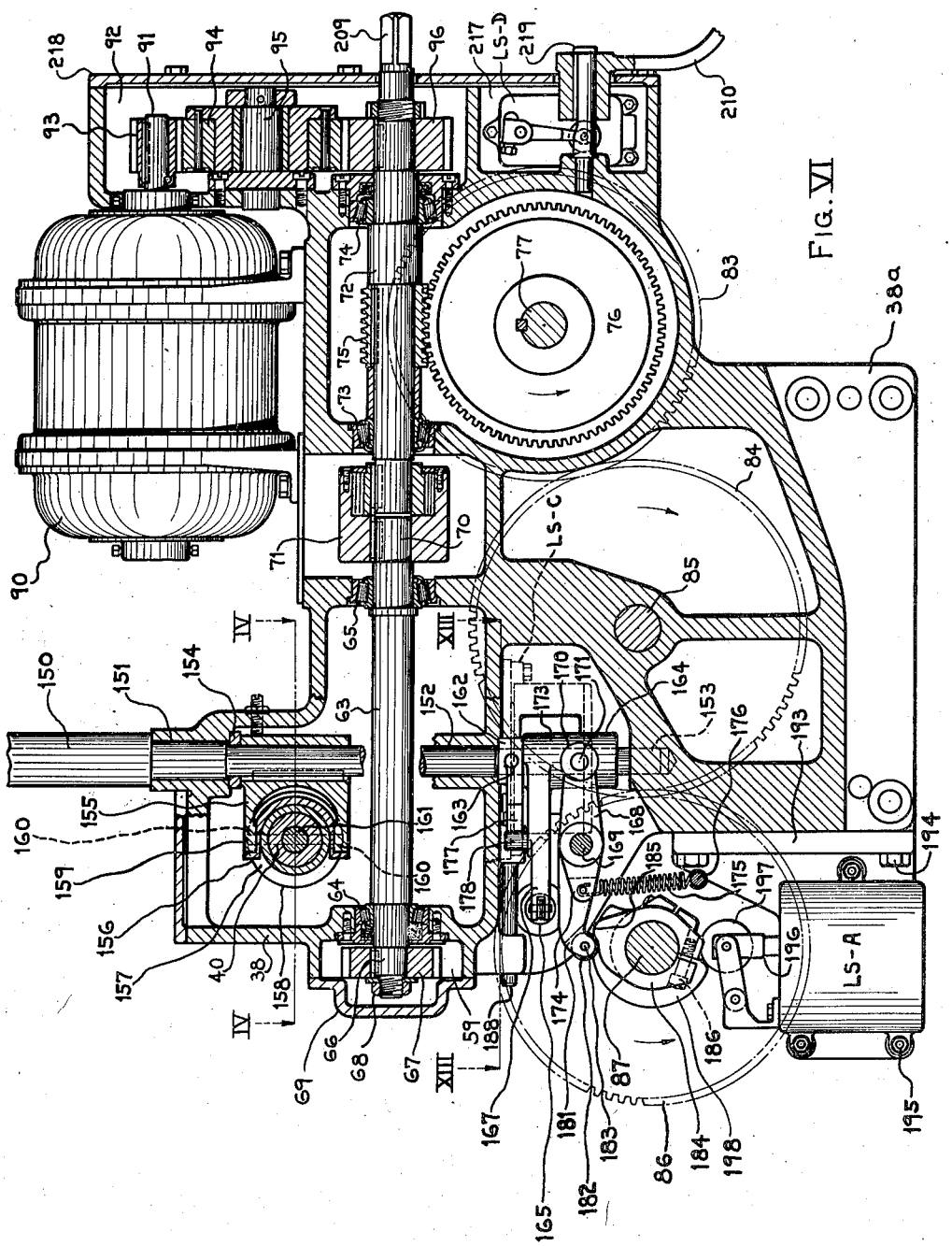
INVENTOR.
WILLIAM F. GROENE
ROSS M. BACON
BY Willard L. Groene
ATTORNEY.

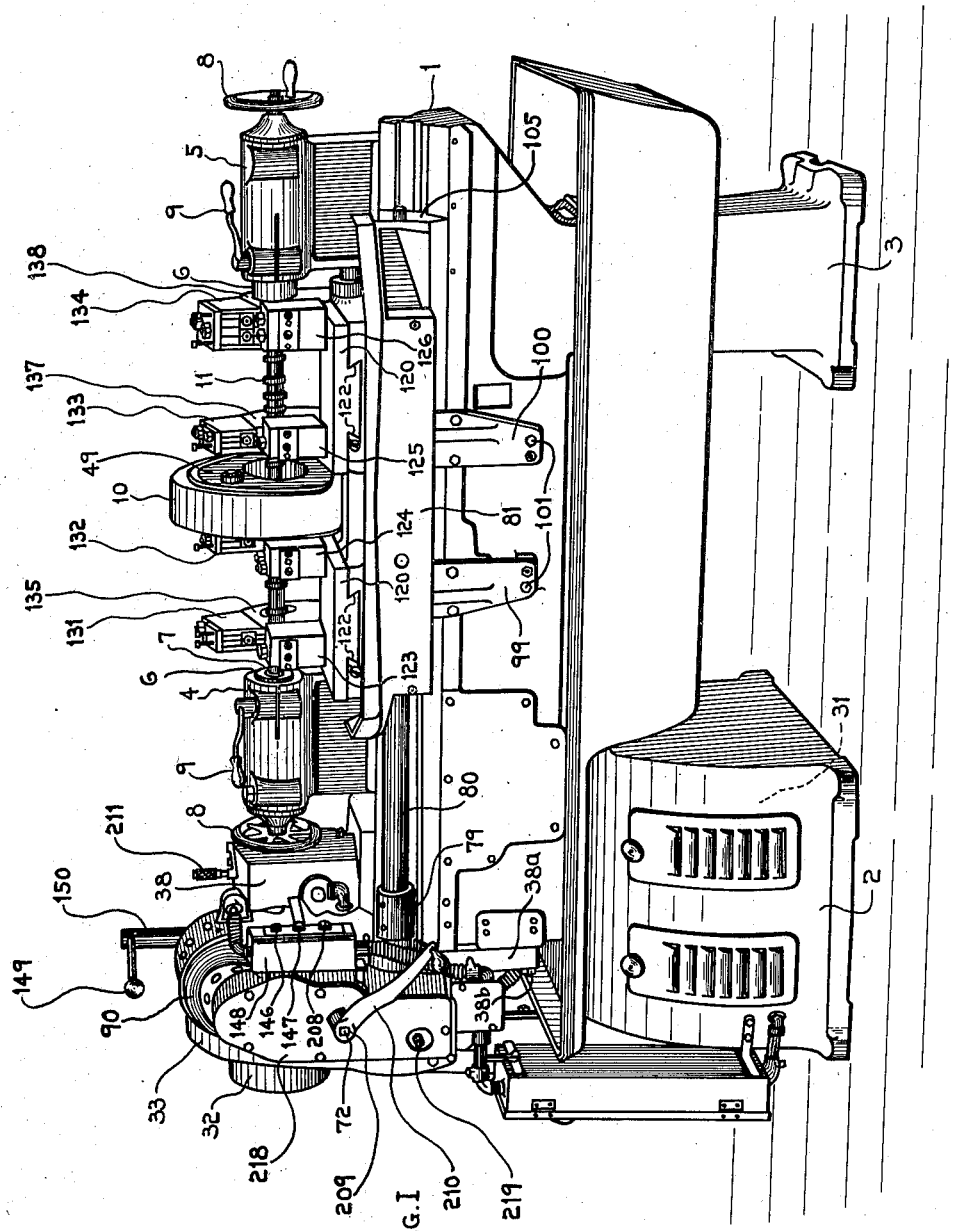

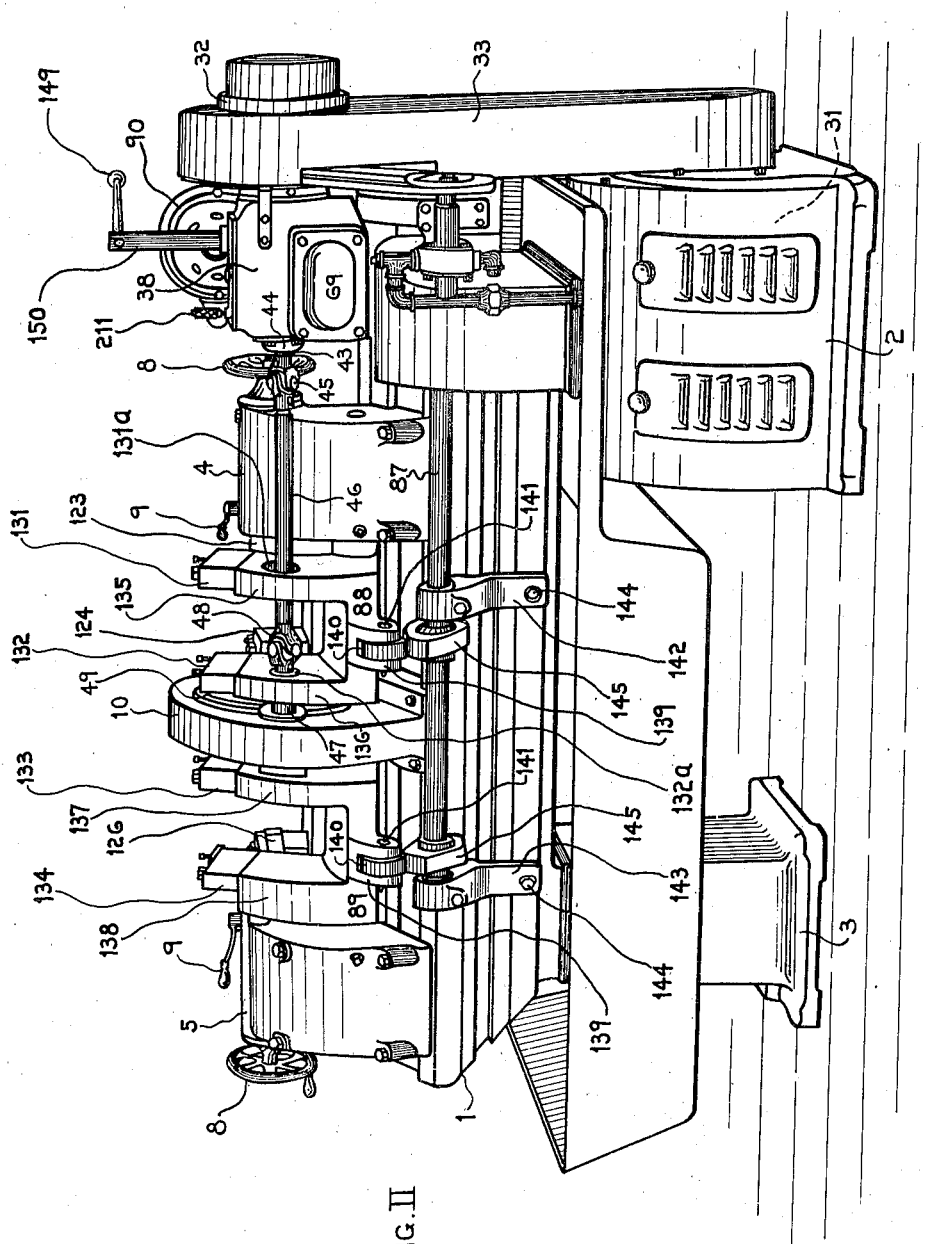

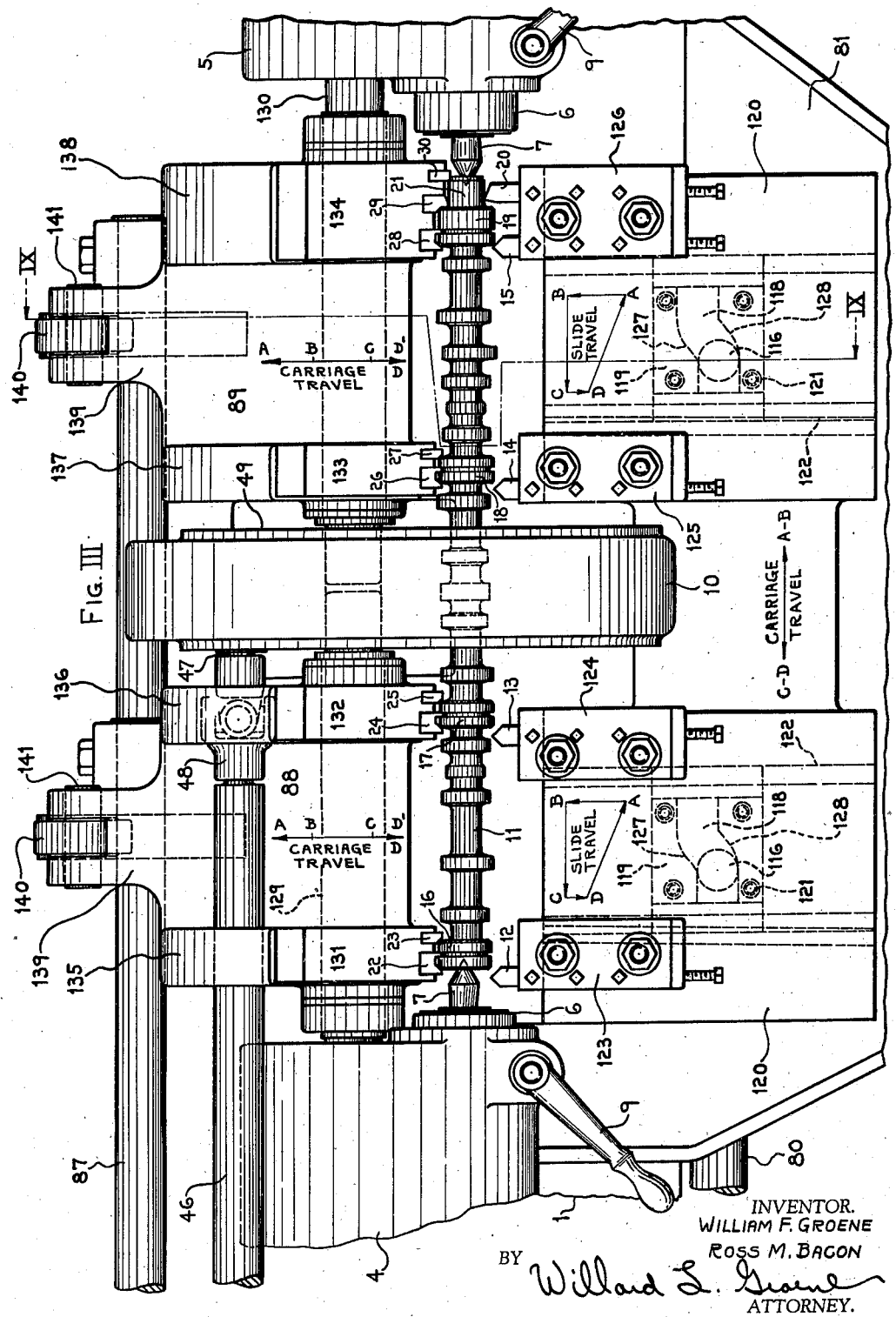

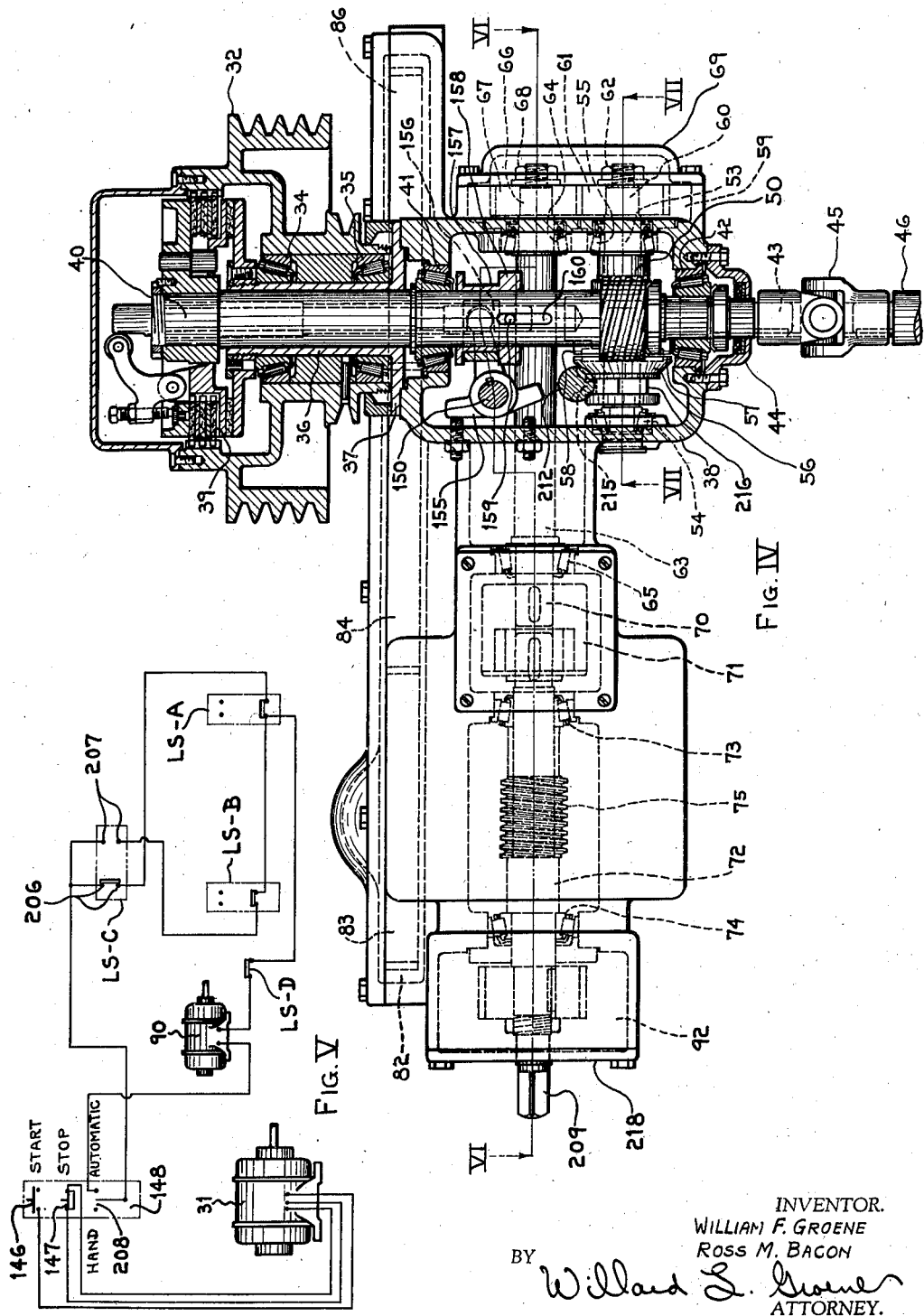

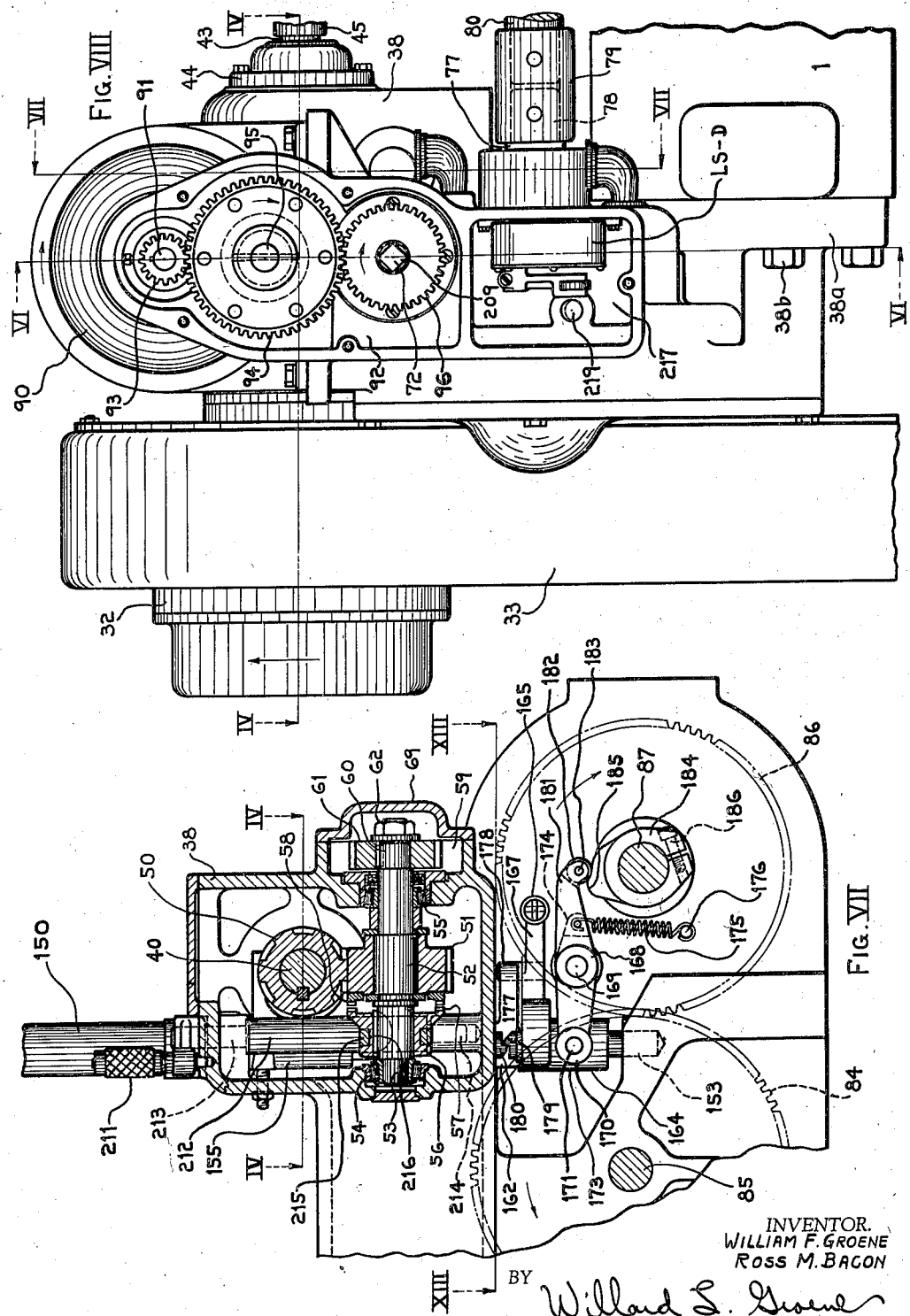

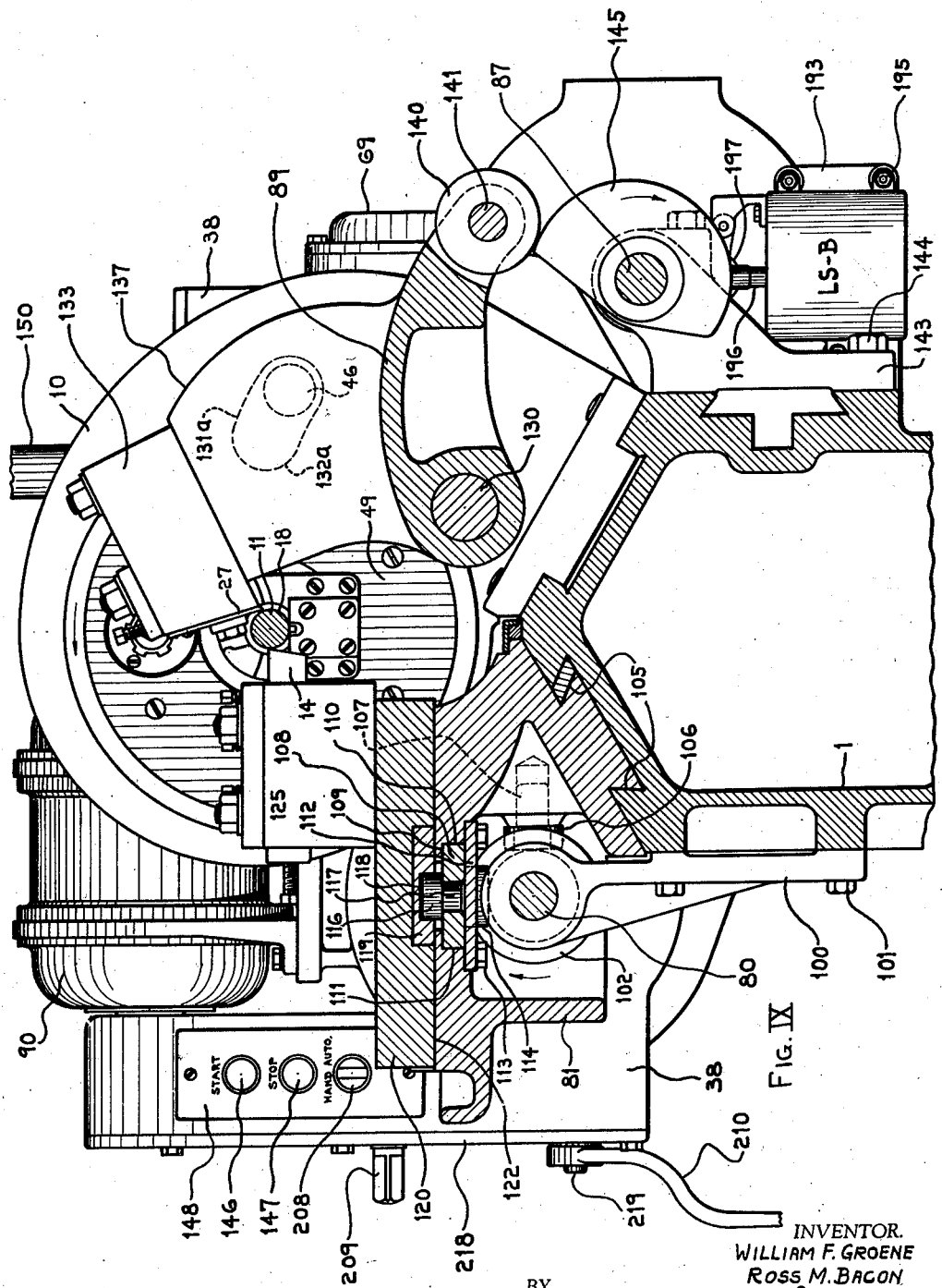
July 19, 1938.  W. F. GROENE ET AL  2,124,347
CENTER DRIVE CAMSHAFT LATHE
Filed Jan. 21, 1937   10 Sheets-Sheet 7
FIG. IX
INVENTOR.
WILLIAM F. GROENE
ROSS M. BACON
BY Willard L. Groene
ATTORNEY.

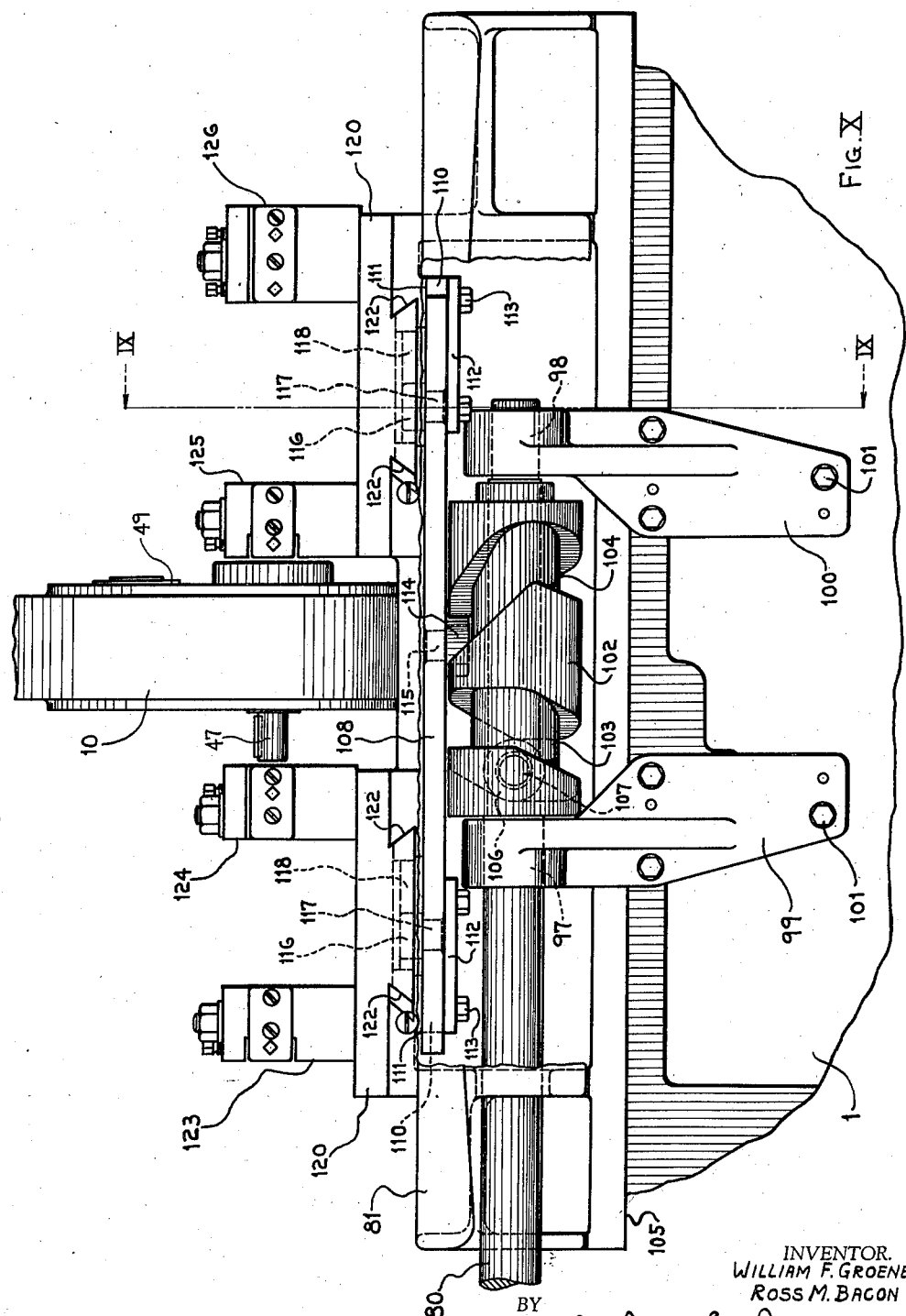

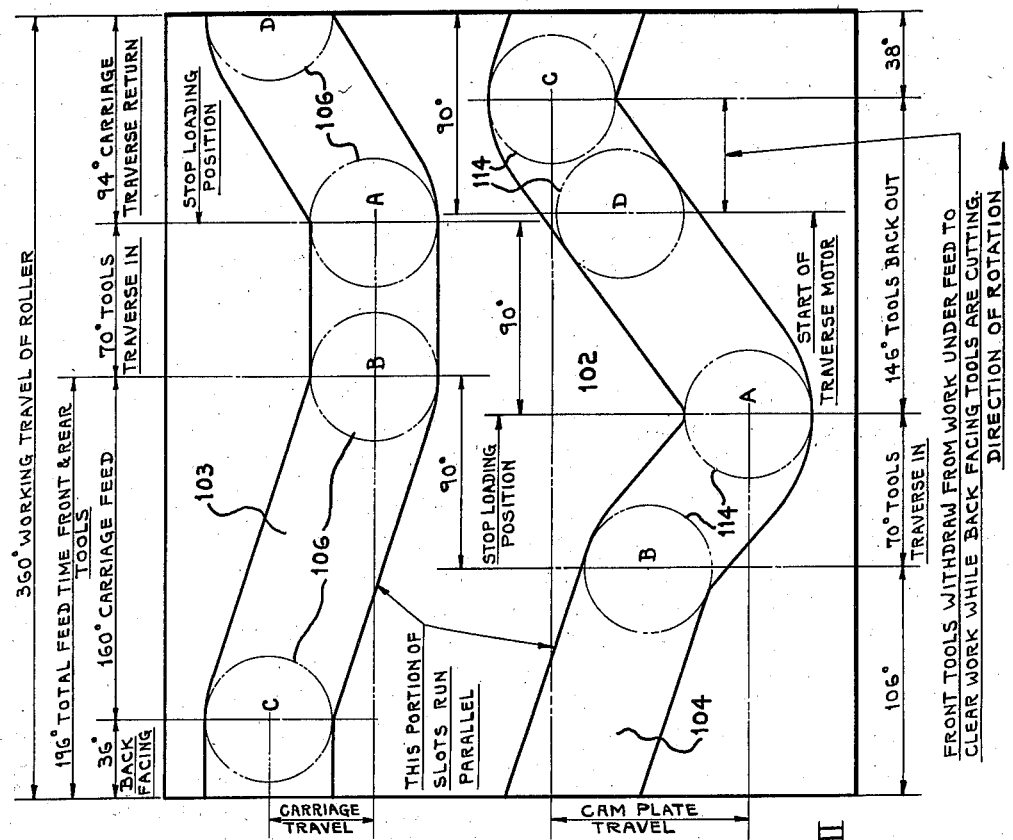
Fig. XII
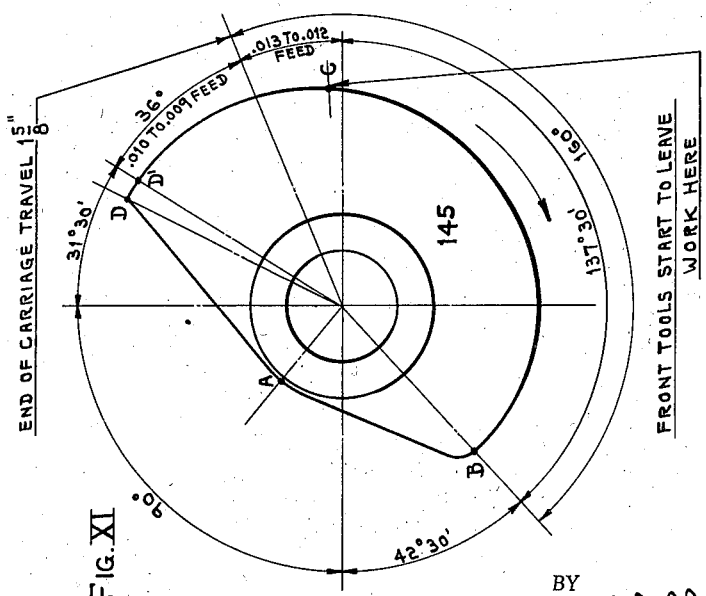
Fig. XI
INVENTOR.
WILLIAM F. GROENE
ROSS M. BACON
BY Willard L. Groene
ATTORNEY.

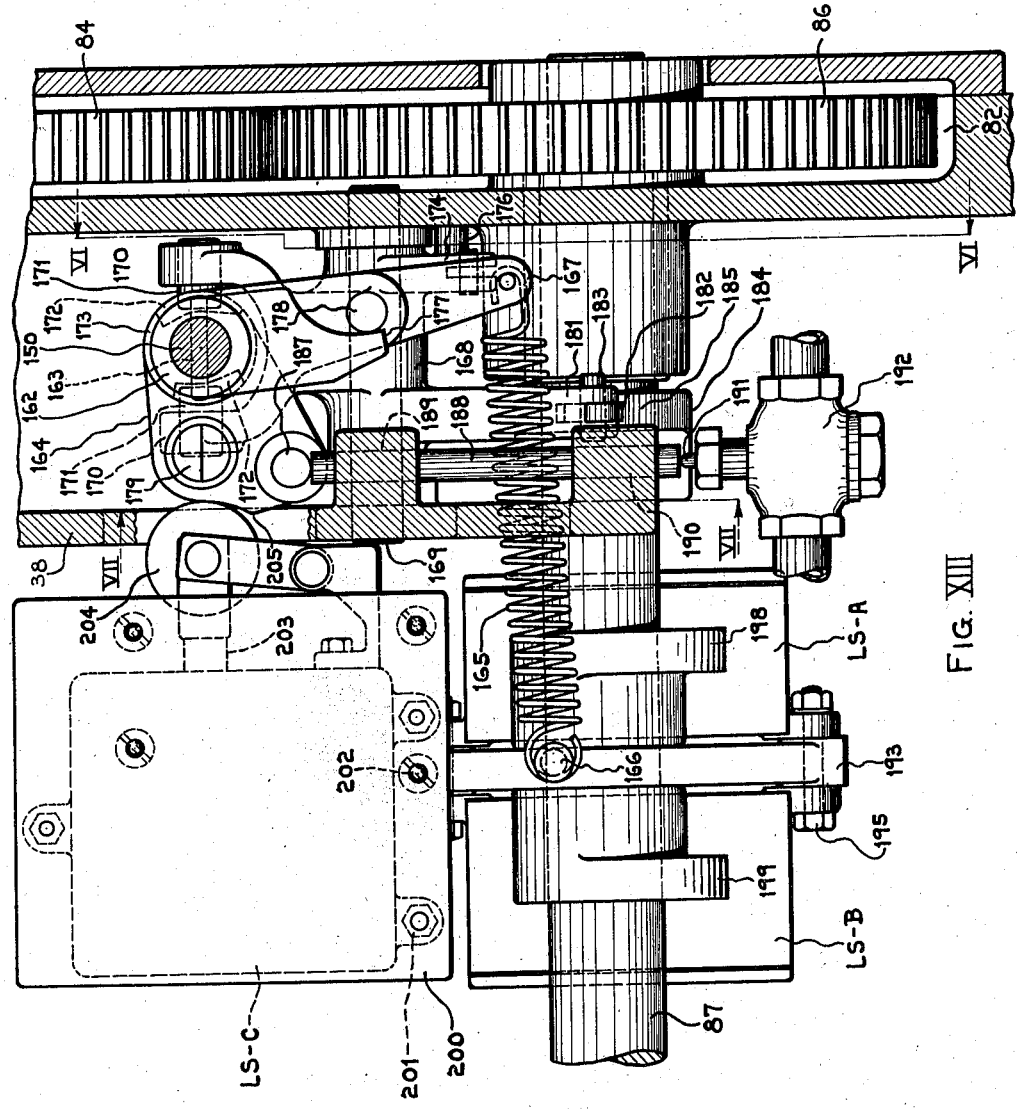

Patented July 19, 1938

2,124,347

UNITED STATES PATENT OFFICE 2,124,347

CENTER DRIVE CAMSHAFT LATHE

William F. Groene and Ross M. Bacon, Cincinnati, Ohio, assignors to The R. K. Le Blond Machine Tool Company, Cincinnati, Ohio, a corporation of Delaware Application January 21, 1937, Serial No. 121,510

17 Claims. (Cl. 82—19)

Our invention pertains to center drive lathes adapted to chuck and rotate relatively long shafts, axles, and the like, intermediate the ends thereof so that machining operations may be undertaken simultaneously and with a single chucking operation on the major portion of said workpieces. More particularly this invention pertains to a lathe adapted to machining bearing and other surfaces on camshafts for internal combustion engines.

Prior to our invention camshafts for multi-cylinder internal combustion engines were chucked and rotated intermediate the ends of the camshafts but tools were applied to machining only one end of the work, the work later being rechucked in another machine to complete the other end of the work. Because of the relatively frail nature of such a camshaft it has long been considered impractical to attempt to simultaneously machine both ends and intermediate portions of said camshafts by a single chucking operation in a single machine. By our invention we have greatly increased the efficiency of the art of camshaft turning in that we have combined the former two operations into a single operation thereby effecting great savings in equipment, handling, and in producing more accurate and greater quantities of the finished shafts with considerably less effort.

An object of our invention is to provide a lathe whereby turning operations may be undertaken on the ends and intermediate portions of relatively long, slender work pieces.

Another object of our invention is to provide a lathe wherein a camshaft may be chucked and rotated and tools applied to said camshaft whereby all of the bearings and associated portions may be simultaneously turned in a single operation.

Another object of our invention is to provide a center drive lathe adapted to chuck and rotate a camshaft intermediate its ends and to apply tools to the workpiece whereby all the main bearing portions, gear fit, oil grooves, and chamfering of said main bearings may be simultaneously accomplished in a single operation.

Our intention is further to provide a relatively simple and efficient feed mechanism for the lathe wherein none of the feed transmission is reversed during the machining cycle, the purpose of which is to eliminate costly reversing mechanism in connection with the feed transmission and also to eliminate the shock and strain on the apparatus inherent in reversible mechanism.

Still another object is to provide simple and fully automatic mechanism for relieving the turning or longitudinally feeding tools from cutting position during the return travel of the tools to initial starting position, the purpose of which is to prevent scoring of the work surface already turned.

We also contemplate providing a manual means for operating the tool carriages and a safety device in connection with said operating means to prevent surprise operation of the rapid traverse motion of the carriages and possible injury to the operator.

In connection with this lathe we prefer to use a chucking device of a character disclosed and claimed in application Serial No. 108,039, filed Oct. 28, 1936.

Further objects will appear in the course of the following description of the drawings in which:

Figure I is a perspective view of the front of a lathe incorporating the principles of our invention.

Figure II is a perspective view of the rear of the lathe shown in Figure I.

Figure III is a plan view of the intermediate portion of the lathe showing the relationship of the work, the chucking mechanism, and the cutting tools as applied to simultaneously machining all the bearing portions and related surfaces on a camshaft for a multi-cylinder internal combustion engine.

Figure IV is a plan view partly in section on line IV—IV of Figures VI, VII, and VIII, showing the main driving mechanism for rotating the work holder and the power takeoff for the feed mechanism.

Figure V is a diagrammatic layout of the electrical operating and control circuit and associated devices of the lathe.

Figure VI is a vertical transverse section through the lathe on the line VI—VI of Figures IV and VIII particularly showing the rapid traverse drive mechanism and the operating mechanism for the combined clutch and brake.

Figure VII is a vertical transverse section through the lathe on the line VII—VII of Figures IV and VIII particularly showing the clutch for engaging and disengaging the feeding motion and control mechanism associated therewith.

Figure VIII is an enlarged front elevation of the left hand portion of the lathe showing particularly the rapid traverse drive mechanism and the safety device for preventing actuation of the traverse motion of the carriages when the carriages are being operated manually.

Figure IX is a vertical transverse section through the lathe on the line IX—IX of Figures III and X showing the relationship of the front and rear tool carriages and the cam mechanism for actuating said tool carriages.

Figure X is a front elevation of the front turning or longitudinally feeding tool carriage, partly broken away, to more clearly show the cam mechanism for actuating the carriage and relieving the turning tools from the work upon their return to initial starting position.

Figure XI is an axial view of the cams for actuating the rear tool carriages.

Figure XII is a layout of the periphery of the cam for actuating the front turning or longitudinally feeding carriage and relieving the turning tools from the work piece.

Figure XIII is a plan view partly in section on line XIII—XIII of Figures VI and VII particularly showing the control mechanism for the combined brake and chuck and rapid traverse mechanisms.

The general arrangement, Figs. I, II, and III, of the lathe comprises a bed 1 which is supported on legs 2 and 3. Mounted on the bed 1 are tailstocks 4 and 5 each having axially reciprocatable spindles 6 supporting centers 7 which spindles 6 may be adjusted axially by means of the usual handwheels 8 and locked in adjusted position by means of the usual lever clamping means 9. On the bed 1 between the tailstocks 4 and 5 is also mounted a center drive chuck member 10 which is adapted to grip and rotate a camshaft 11 intermediate its ends, as for example in a manner shown in application Serial No. 108,039, filed Oct. 8, 1936.

Noting particularly Fig. III, each side of the center drive chuck member 10, and between the tailstocks 4 and 5, are located turning or longitudinally feeding tools 12, 13, 14, and 15 adapted to turn the outside diameter of all the main bearings 16, 17, 18, and 19, respectively, and the tool 20 adapted to turn the gear fit diameter 21 of the cam shaft 11. Also arranged each side of said center drive chuck member 10 and between said tailstocks 4 and 5 are cutting tools 22—23, 24—25, 26—27, 28—29, and 30, which feed transverse of the workpiece to thereby chamfer and oil groove all of said main bearings 16, 17, 18, and 19, respectively, and chamfer the end of the gear fit 21. Such an arrangement as just described permits the complete machining simultaneously of all the main bearings and associated portions of a camshaft in one operation.

*Work rotating mechanism*

The source of power for rotating the center drive chuck in the member 10 is derived from the usual electric motor 31 (Fig. V) which is mounted inside the leg 2 and is connected to the main driving pulley 32 by means of the usual V-belts housed in the cover 33 at the left hand end of the lathe. The main driving pulley 32 (Fig. IV) is rotatably mounted on suitable bearings 34 and 35 carried on the projecting hub 36 of the bracket 37 which bracket in turn is secured to the transmission housing 38 mounted on the left hand end of the bed by means of the flange 38a and bolts 38b and incorporates a combined clutch and brake mechanism 39 substantially as fully disclosed and claimed in Patent 1,474,112 issued Nov. 13, 1923, which mechanism will therefore not be described in detail here. By means of this combined clutch and brake mechanism 39, the main drive shaft 40 may be alternately connected or disconnected from the driving pulley 32 and said shaft may also be braked from further rotation or coasting immediately upon disengagement of the driving pulley 32 from said main drive shaft 40.

The main drive shaft 40 is journaled and confined from axial movement in anti-friction bearings 41 and 42 appropriately mounted in the housing 38 and has an end portion 43, which projects through a suitable closure cap 44 attached to housing 38, to which is fixed a universal joint 45. Also fixed to the universal joint 45 is the shaft 46 which in turn is connected to the driving pinion shaft 47 of the center drive chuck member 10 through the universal joint 48. The shaft 47 carries the usual driving pinion (not shown) for driving the ring gear (not shown) of the chucking device 49 of the center drive chuck member 10. It can thus be seen that through this mechanism driving power from the motor 31 may be applied or disconnected from the center drive chucking device 49 in the member 10.

*Feed drive mechanism*

Fixed to the main drive shaft 40 intermediate the anti-friction bearings 41 and 42 is a worm 50 adapted to drive the worm wheel 51 (Fig. VII) rotatably mounted on the bearing portion 52 and confined from all axial movement of the worm wheel shaft 53 which is journaled and confined from axial movement by the anti-friction bearings 54 and 55 appropriately mounted in the housing 38. Mounted on the shaft 53 between the worm wheel 51 and anti-friction bearing 54 is a clutch member 56 adapted to slide axially of the shaft 53 but to rotate positively therewith and having clutch teeth 57 adapted to engage or disengage mating clutch teeth 58 fixed on the worm wheel 51 by axial movement of the clutch member 56. It can thus be seen that by this arrangement the worm wheel 51 may be caused to alternately drive the shaft 53 or to rotate freely on said shaft.

Referring particularly to Figures IV, VI, and VII, the worm wheel shaft 53 projects rearwardly of the lathe beyond the bearing 55 into a pocket 59 and has the usual splined portion 60 to which may be applied suitable change gears, as, for example, the gear 61 held in place on the shaft 53 by nut 62. Arranged parallel with the worm wheel shaft 53 is a shaft 63, journaled on and confined from axial movement by the anti-friction bearings 64 and 65 appropriately mounted in the housing 38 and has the usual splined portion 66, projecting beyond the bearing 64 and into the pocket 59, to which may be applied suitable change gears as, for example, the gear 67 held in place by nut 68 which gear is adapted to be driven by gear 61 on the worm wheel shaft 53. A cover 69 is removably mounted over the pocket 59 for easy access to said change gear mechanism.

On the end 70 of the shaft 63 projecting beyond the bearing 65 is fixed an over-running clutch 71 by which the shaft 72 may be rotated in only one direction, clockwise as shown in Figure VIII, as is characteristic of over-running clutch devices, so that the shaft 72 may only be rotated by the shaft 63 for forward feeding motion through the mechanism about to be described. The shaft 72 is journaled on and confined from axial movement by the anti-friction bearings 73 and 74 appropriately mounted in the housing 38 and has a worm 75 fixed thereon intermediate these bearings which is adapted to drive the relatively large worm wheel 76 mounted on the shaft 77 extending longitudinally of the lathe and appropriately journaled in the housing 38. The shaft 77 projects to the right (Figures I and VIII) from the housing 38 and has an end portion 78 to which is fixed a coupling 79 which in turn is fixed to the feed drive shaft 80 for the front carriage 81. The shaft 77 also projects to the left into a pocket 82 formed in the housing 38 and has a relatively large gear 83 fixed on said projection which gear is adapted to drive an idler gear 84 rotatably mounted on a stud 85 fixed in the housing 38, which idler gear, in turn, is adapted to drive the gear 86 fixed on the feed drive shaft 87 for the rear tool carriages 88 and 89. This arrangement clearly sets forth the mechanism whereby both the front and rear carriage feed mechanisms may be simultaneously actuated in feeding motion from the main drive motor 31.

Rapid traverse drive

Noting particularly Figures VI and VIII, power for actuating the tool carriages in rapid traverse movements is derived from the electric motor 90 mounted on the housing 38. The shaft 91 of the motor 90 projects into a compartment 92 formed integral with the housing 38 and has a pinion 93 fixed thereon which is adapted to drive the idler gear 94 appropriately rotatably mounted on a stud 95 fixed in the housing 38, which idler gear in turn is adapted to drive the gear 96 secured to the shaft 72. It can thus be seen that by energizing the motor 90 the shaft 72 and the mechanism driven through the worm 75 and worm wheel 76 may be rotated by said motor. It is to be noted (Figure VIII) that the motor is arranged to rotate the shaft 72 only in the same direction as it is normally rotated in feeding motion by the shaft 63 as described. It is also to be noted that by use of the over-running clutch 71 the motor 90 may at any time be energized to accelerate and rotate the shaft 72 at a relatively much greater speed than it is rotated by shaft 63 without in any way affecting the rotation of shaft 63 and the driving mechanism connected thereto, and, by de-energizing the motor 90 the shaft 72 will again be automatically driven by the shaft 63 when the rate of rotation of shaft 72 has decelerated to the speed of said shaft 63. By this arrangement the tool actuating mechanism may be rotated constantly in the same direction, except when stopped for loading or unloading work in the lathe, and that at any desired time rapid traverse motion may be imposed upon said mechanism or may be disconnected therefrom and the feeding automatically continued.

Front tool carriage

Referring particularly to Figures III, IX, X, and XII, the feed drive shaft 80, which is confined from axial movement by being connected to the shaft 77 as described, is supported in suitable journals 97 and 98 in the brackets 99 and 100, respectively, these brackets being secured to the bed 1 of the lathe by suitable screws 101. On the shaft 80, between the bearings 97 and 98, is fixed the cylindrical cam 102 which has a pair of cam slots 103 and 104 arranged around its periphery.

Noting Figures IX and X the front carriage 81 is mounted for longitudinal movement on the usual dovetail slide 105 along the bed 1 of the lathe. A cam roller 106 is rotatably mounted on an appropriate stud 107 fixed in the front carriage 81, and engages in the cam slot 103 so that upon rotation of the cam 102 by shaft 80 the front carriage 81 may be actuated longitudinally of the bed 1.

A relatively long cam plate 108 is slidably mounted for movement longitudinally of the bed 1, in a guide comprising the faces 109, 110, and 111, and held in proper engagement with said faces by suitable gibs 112 secured to the carriage 81 by screws 113. A cam roller 114 is rotatably mounted on an appropriate stud 115 fixed in the cam plate 108 and engages in the cam slot 104 so that upon rotation of the cam 102 by shaft 80 the cam plate 108 may be actuated longitudinally of the bed 1 and carriage 81.

A pair of cam rollers 116, appropriately mounted on studs 117 fixed in the cam plate 108, engage in slots 118 (Fig. III) of cams 119 secured to the tool slides 120 by screws 121, the tool slides 120 being arranged to slide to and from the axis of the lathe on the usual dovetail guides 122. It can thus be seen that when the cam plate 108 is moved relative to the carriage 81 the cam roller 116 will likewise be moved in slots 118 of cams 119 so as to cause transverse movement or movement of the slides 120 to or from the work piece 11. On the tool slides 120 are mounted appropriate tool holders 123, 124, 125, and 126 for holding the respective tools 12, 13, 14, and 15 and 20 which perform cutting operations as already described.

The movement of the tool slides 120 and the tools mounted thereon relative to the work piece of camshaft 11, is diagrammatically shown by the arrows A—B—C—D indicated on the slides 120 and the movement of the carriage 81 on the bed 1 is shown by the arrows A—B and C—D on the carriage shown in Figure III. Noting particularly Figures III and XII, at the beginning of the machining cycle the slides 120 and carriage 81 are at A, the tools 12, 13, 14, 15, and 20 being withdrawn from cutting position and to the right of the respective portions 16, 17, 18, 19 and 21 to be turned on the camshaft 11. As the cam 102 is rotated, the roller 114 is moved longitudinally from A to B in the cam slot 104 while the roller 106 does not move as it travels from A to B in slot 103 as this portion of the cam slot 103 is parallel to the direction of rotation of the cam 102. Thus the carriage is held stationary relative to the bed of the lathe while the cam plate 108 is moved relative to the carriage 81 whereupon the rollers 116 bearing against the angular portions 127 of the slots 118 of cams 119 cause the slides 120 to travel toward the work to cutting position, indicated by arrow A—B, Fig. III.

Next, the roller 106 is caused to follow the annularly disposed portion from B to C of the cam slot 103 upon continued rotation of cam 102 to thereby cause longitudinal feeding of the carriage 81 to the left (Fig. III) so as to cause the aforementioned cutting tools to turn their respective portions to be machined. In order to maintain the rollers 116 in position for holding the slides 120 in proper cutting position as shown in Fig. III the portion of the slot 104 of cam 102, traveled by roller 114 from B to C, is arranged parallel with the same portion B to C of slot 103 so that there will be no relative motion of the cam plate 108 and the carriage 81, the cam plate 81 being moved relative to the bed 1 of the lathe at the same rate and in the same direction as that of the relative movement of the carriage 81 to the bed 1 in traveling from B to C. By this arrangement the turning or longitudinal feed operations on the workpiece are completed.

At the completion of the turning operation the roller 106 is again caused to follow a portion of the cam slot 103 from C to D, which is parallel to the direction of motion of the cam 102, whereby the carriage 81 is held stationary on the bed at the completion of said turning. Meanwhile the roller 114 is caused to follow the angularly related portion of cam slot 104 from C to D whereby the cam plate 108 is moved relative to the carriage 81 causing the rollers 116 to bear against the angular portions 128 of the cam slots 118 of cam 119 and thereby start the withdrawal of the slides and tools from cutting position, the tools being moved along a path indicated by arrow C—D of Figure III a substantial distance from the work before the carriage 81 and slides 120 are simultaneously moved to the initial starting position A as roller 106 is caused to move along the angular portion of slot 103 from D to A, returning the carriage, and roller 114 is caused to continue along the angular portion of slot 104 from D to A to fully retract the slides 120 and the tools from the work piece, the slides and tools following a path relative to the bed 1 substantially as shown by arrow D—A of Figure III. It can thus be seen that by this mechanism we provide means actuated from a non-reversing source of power to bring turning tools to position for turning operations and to relieve said tools from said position when returning the tools to initial starting position for the purpose of preventing any marring of the previously turned surface.

Rear tool carriages

Referring particularly to Figures III, IX, and XI, the rear tool carriage 88 is pivotally mounted and axially confined on the shaft 129, which shaft is fixed in the tailstock 4 and the center drive chuck member 10 and the rear tool carriage 89 is pivotally mounted and axially confined on the shaft 130, which shaft is fixed in the tailstock 5 and the center drive chuck member 10. Appropriate tool holders 131, 132, 133 and 134 carry the respective tools 22—23, 24—25, 26—27, and 28—29—30 on the integral upright standards 135 and 136 of the carriage 88 and 137 and 138 of carriage 89. Suitable elongated holes 131a and 132a are provided in the standards 131 and 132 to allow passage of shaft 46. On the lower rearward portion of each tool carriage 88 and 89 are formed integral forked projections 139 which carry a roller 140 between the forked ends on a suitable stud 141 fixed in said forked portions.

The feed drive shaft 87 is journaled in suitable brackets 142 and 143 secured to the rear of the bed 1 by screws 144 (Fig. II). Peripheral cams 145 are fixed on said shaft 87, preferably adjacent the brackets 142 and 143 for adequate support, which cams 145 contact and support the rollers 140 of the tool holders 88 and 89, whereby rotation of the shaft 87 and the cams 145 will cause the tool holders 88 and 89 to be rocked about their respective pivot shafts 129 and 130 to move the rear tools 22—23, 24—25, 26—27, and 28—29—30, to or from the work piece 11.

Noting particularly Fig. XI, the cams 145 have their peripheries so arranged that upon rotation of said cams by shaft 87 the rollers 140 are caused to travel along these cams from A to B to cause the rear tools to move in rapid traverse toward the camshaft 11; as the rollers travel from B to C said tools are actuated at relatively coarse feed; as the rollers travel from C to D¹ said tools are actuated at relatively fine feed; as the rollers travel from D¹ to D the tools will be held stationary in dwell for sizing the work piece; and as the rollers travel from D to A, the tools will be returned from the work in rapid traverse to the initial starting position A.

The same reference characters A, B, C and D (Figure III) have been used for both the front turning tools and the rear forming tools so as to more clearly show the relative positions simultaneously assumed by both groups of tools during the machining cycle. For example as the front tools are moved from A to B into cutting position the rear tools (as indicated by the arrows on the rear tool carriages 88 and 89 of Figure III) are moved from A to B in rapid traverse; as the front tools move from B to C performing the turning operation the rear tools move from B to C at coarse feed for the purpose of removing any excessive stock or flash which might exist on the work 11. Normally, no actual cutting is done by the rear tools during their travel from B to C. Next, the front tools are withdrawn from cutting position from C to D while the rear tools begin and complete the forming operations and dwell from C to D¹—D; and finally the front tools are further retracted and returned to initial starting position from D to A while the rear tools are similarly retracted to their initial starting position from D to A. It is to be noted that as the tools travel from A to B and from D to A the feeding cams and the shaft 80 and 87 associated therewith are rotated at rapid rates by the rapid traverse motor 98 by means of the mechanism already described and that as the tools travel from B to D said cams and shafts are rotated at feeding speed directly from the main drive motor 31 as described. Thus it can be seen that we provide cam means for actuating the tools at rapid traverse and various rates of feed and that we supplement the functions of the cams with appropriate high and low speed drives for said cams to render them more effective in producing said rapid traverse and various feeding rates of tool movement. It is further to be noted that we accomplish all of said tool movements without reversing any portion of the lathe transmission.

Operation and control

During the normal operation of the lathe the main drive motor 31 is at all times rotating. The usual start push button 146 and stop push button 147 are provided in the push button control station 148 for turning the motor 31 on and off when the lathe is not being used.

The combined clutch and brake mechanism 39 is operated by manipulating the starting handle 149 which has an integral vertical rock shaft 150 carried in bearings 151, 152, and 153 in the housing 38 (Figure VI). Immediately below the bearing 151 is a thrust collar 154 and a shifter yoke 155 fixed to the shaft 150 to thereby prevent axial movement of the shaft 150. The shifter yoke 155 has the usual shoes 156 at its outer ends which ride in the annular slot 157 in the shifter spool 158. The spool 158 is free to move axially of the shaft 40 upon which it is carried and is caused to rotate with said shaft 40 by means of the pin 159 which passes diametrically through the spool 158, through the axially elongated slots 160 in the shaft 40, and through the shifter rod 161. By this arrangement the combined clutch and brake mechanism can be manually rendered effective or ineffective as fully set forth in Patent 1,474,112 aforementioned so that by moving the handle 149 toward the right hand end of the lathe the main motor 31 will be caused to rotate the center drive chucking device 49 and to drive the feeding mechanism, and that by returning said handle 149 toward the left hand end of the lathe the motor 31 will be disconnected and the center drive chucking device 49 and the feed mechanism stopped.

Directly below the bearing 152 (Figures VI, VII, and XIII) is an arm member 162 secured to the rock shaft 150 by a suitable pin 163. Below the member 162 is pivotally mounted the latch member 164 on the rock shaft 150 and which member is also adapted to axial movement on the said rock shaft 150. The latch member is normally urged in a clockwise direction (Figure XIII) about the rock shaft 150 by the tension spring 165 connected to a stud 166 fixed in the housing 38 and connected at its other end to a projecting arm 167 of the latch member 164.

Noting Figures VI, VII, and XIII, the latch member 164 is normally urged axially upward of the shaft 150 by the lever 168 which is pivotally mounted on the shaft 169 and has forked end portions 170 each of which have pins 171 fixed therein and adapted to engage in peripheral slots 172 in the hub portion 173 of the latch member 164, said lever 168 also having a projecting arm 174, extending diametrically opposite to said portions 170, to the end of which is attached a tension spring 175 whose other end is fixed to the stud 176 fixed in the housing 38.

Formed integral with the member 162 is a projecting arm 177 adapted to engage a pin 178 fixed in the arm 167 of the latch member 164 whereby rotation of shaft 150 in an anti-clockwise direction (Figure XIII) will cause similar rotation in the latch member 164 whereupon the spring 165 is stretched, and upon release of said lever the shaft 150 may be returned in a clockwise direction by the spring 165.

In order to hold the latch member 164 in the anti-clockwise rotated position shown particularly in Figures VII and XIII, a latch dog 179 is provided on the latch member 164 which is adapted to engage and latch about the catch plate 180 fixed on housing 38 under the influence of the spring 175 and associated mechanism as described which normally urges the member 164 and its dog 179 against said catch plate 180. It is to be noted that when the latch member 164 is so held by the catch plate 180 the handle lever 149 is free to be manipulated at any time to operate the combined clutch and brake mechanism 39 for stopping or starting work rotation and tool feeding.

Means are provided for automatically disengaging the dog 179 from the catch plate 180 so as to trip the latch member 164 and thereby rotate shaft 150 and disengage the spindle rotation and feeding at a predetermined point in the machining cycle. This means comprises the lever arm 181 formed integral with the lever 168 which supports a roller 182 on a suitable pin 183 fixed in the end thereof. On the shaft 87 is mounted a trip dog 184 having a cam lobe 185 which is adapted to contact the roller 182 at a predetermined position of rotation of shaft 87 and to thereby raise lever 181 (Figures VI and VII) against the spring 175 thus moving the latch member 164 axially downward to disengage the dog 179 from catch plate 180 whereupon the spring 165 rotates the latch member 164 clockwise (Figure XIII) and, through the mechanism described, disconnects the main drive motor 31 from the work rotating and feeding mechanism. A suitable adjusting screw 186 is provided in the trip dog 184 so that said dog 184 may be clamped in a circumferential position on shaft 87, preferably in such a position as to trip the starting handle just after the tools have left position D (Figure III) in rapid traversing to the initial starting position A.

Means are also provided for automatically controlling the coolant supply for the tools comprising a pin 187 fixed on the latch member 164 which engages the push rod 188 carried in suitable supports 189 and 190 in the housing 38 which rod in turn contacts the plunger 191 of the self closing coolant control valve 192. By manipulating the starting lever 149 the latch member 164 will be moved as described thereby starting work rotation and feeding of the tools, the pin 187 pushing the rod 188 against the plunger 191 to open valve 192 causing coolant to flow to the cutting tools, and upon tripping the starting lever to stop work rotation and tool feeding the pin 187 will be withdrawn from rod 188 allowing the plunger to push the rod 188 and extend itself, thereby closing valve 192 and shutting off the coolant from the cutting tools.

In Figure V is shown the general arrangement of the control mechanism for rendering the rapid traverse motor 90 operative and inoperative at appropriate times.

The limit switches LS—A and LS—B are single throw switches which are mounted on the bracket 193 secured to the bed 1 by bolts 194, the switches being bolted together each side of the bracket 193 by suitable bolts 195. Each switch has the usual plunger 196 and roller 197. The limit switch LS—A is actuated by the cam 198 and the limit switch LS—B is actuated by the cam 199, both of which cams are appropriately mounted on the shaft 87 (Figure XIII).

The limit switch LS—C is a two-way switch adapted to render either switch LS—A or LS—B operative, and is mounted on a plate 200 by screws 201 which plate in turn is secured to the housing 38 by suitable screws 202, this switch having the usual plunger 203 and roller 204. This switch is actuated by the cam portion 205 formed integral with the latch member 164. The switch normally contacts the terminals 206 (Figure V) when the roller 204 is released as shown in Figure XIII and when the starting lever 149 is tripped as described, the cam portion 205 depresses the roller 204 and plunger 203 so as to contact the terminals 207 and disconnect terminals 206.

The limit switch LS—D is a safety switch which functions in connection with the manual means for actuating the tool carriages.

In the push button station 148 is also provided a two-position snap switch 208 whereby the entire rapid traverse electrical system may be rendered operative or inoperative by setting the switch 208 either at "automatic" or "hand" positions respectively as indicated on said switch.

The operating cycle of the machine is substantially as follows: The main drive motor 31 is operating at all times having been set in motion by pressing the "Start" button 146. After having appropriately loaded and chucked a workpiece in the machine, the starting handle 149 is moved to the right (Figure I) whereupon the work is rotated and the feeding mechanism set in motion. As the handle 149 is so moved the limit switch LS—C is actuated by latch member 164 and its cam 205 to disconnect terminals 207 and connect terminals 206. At this time the limit switch LS—A is relieved by the cam 198 and is thereby closed, and limit switch LS—B is contacted and held open by cam 199. Under these conditions the rapid traverse motor 90 is energized to traverse the tool carriages from A to B (Figure III).

When the tool carriages have been rapid traversed to the position B, the limit switch LS—A is opened by the cam 198 de-energizing the rapid traverse motor 90 and arresting the rapid traverse motion, the limit switch LS—B is relieved from the cam 199 and thereby preset in closed position for rapid traverse return, and the limit switch LS—C is still maintained with terminals 206 in contact. With this arrangement the tool carriages are actuated in feeding movement from position B to position D to thereby complete the machining portion of the cycle for all the tool carriages.

When the position D has been reached the cam lobe 185 of the trip dog 184 contacts the roller 182 and thereby trips the starting handle 149 to stop work rotation and tool feeding movements as described, whereupon the cam 205 of the latch member 164 depresses the roller 204 and plunger 203 of limit switch LS—C disconnecting terminals 206 and connecting terminals 207. Meanwhile the limit switch LS—A is still held open by the cam 198 and the limit switch LS—B is still relieved from the cam 199 and remains closed. Under these circumstances the rapid traverse motor 90 is again energized to thereby withdraw the tool carriages to the initial starting or loading and unloading position A.

As the tool carriages reach position A the limit switch LS—A is relieved of the cam 198 and preset in closed position and the limit switch LS—B is actuated by cam 199 and held open, the limit switch LS—C still maintains the terminals 207 in contact so long as the starting handle 149 remains tripped to disconnect the motor 31 from the work rotating and feeding mechanism. Upon again moving the starting handle 149 to the right the limit switch LS—C will disconnect terminals 207 and connect terminals 206 to thereby repeat the cycle described above.

When it is desired to use the starting handle 149 for inching the center drive chucking device 49 around for unclamping the work piece therefrom, the cam 198 is maintained in contact with limit switch LS—A to hold said switch open as the tool carriages travel back and while said carriages remain at position A. The cam 198 is so arranged under these conditions that when the starting handle is moved to begin the operating cycle the tool carriages move to the work piece under feeding speed during a few revolutions of the chucking device 97 before entering into rapid traverse movement toward the work. The starting handle 149 may be manipulated to inch said chucking device a few revolutions when the tools are at the starting position without the machining cycle immediately commencing in rapid traverse of the tools to the work.

Means are provided for manually actuating the tool carriages in either direction when, for instance, the cutting tools are being set or replaced after sharpening. The end of the shaft 72 extending beyond the gear 96 has a squared end portion 209 to which may be applied the usual crank handle 210 for easy manual rotation of the shaft 72 and, through the feed mechanism, movement of the tool carriages. The shaft 72 may be rotated in normal feeding or rapid traverse direction at any time by said handle as the over-running clutch 71 automatically disconnects the shaft 72 from the shaft 63 as described when shaft 72 is so rotated. However, should it be desired to rotate the shaft 72 manually in the opposite direction to normal rotation it will be necessary to disengage the clutch 56 (Figures IV and VII) as the worm wheel 51 cannot drive the worm 50 to permit such rotation of shaft 72. The clutch 56 may be quickly engaged and disengaged by manipulating the control lever 211 to rotate the shaft 212 journaled in the bearings 213 and 214 in the housing 38, which shaft has an integral tooth 215 cut thereon which engages in the annular slot 216 in the clutch member 56 so that by rotation of the shaft 212 said clutch member 56 may be moved axially for engagement or disengagement of the clutch teeth 57 and 58.

A safety device is provided whereby the rapid traverse motor cannot be rendered effective to rotate the shaft 72 at rapid traverse speed so long as the crank handle 210 is applied to the squared end portion 209 thereof. This device comprises the normally open limit switch LS—D conveniently placed near the end 209 of the shaft 72 and connected in series with the motor 90 so that said motor can only be rendered operative by closing said switch LS—D. The switch LS—D is fully enclosed in a pocket 217 covered by the cover 218 and has a stud 219 fixed in the pocket 217 upon which may be placed the crank handle 210 in such a way as to close the limit switch LS—D. It can thus be seen that when the crank handle 210 is placed on the end 209 of shaft 72 the limit switch LS—D will be open preventing operation of the motor 90 and before the motor can be rendered operative the crank handle 210 must be removed from the end 209 and placed on stud 219 so as to close limit switch LS—D.

Having fully set forth and described our invention what we claim as new and desire to secure by Letters Patent is:

1. In a lathe, a rotatable work holder, means for rotating said work holder, tool feeding devices reciprocatable relative to a work piece in said work holder, rotary cam means for longitudinally feeding said tool feeding devices, combined rotary and straight cam means for relieving said tool feeding devices relative to the work piece, and non-reversing transmission mechanism operable by the means for rotating said work holder to render said cam means effective.

2. In a lathe, a rotatable work holder, means for rotating said work holder, tool feeding devices operable to feed cutting tools to and from a work piece in said work holder, cam means for actuating said tool feeding devices, non-reversing transmission mechanism operable by the means for rotating said work holder to actuate said cam means for feeding motion of said devices, and means for imposing more rapid rotation upon said transmission mechanism for actuating said tool feeding devices in rapid traverse motion.

3. In a lathe, a rotatable work holder, means for rotating said work holder, tool feeding devices operable to feed cutting tools to and from a work piece in said work holder, cam means for actuating said tool feeding devices, non-reversing transmission mechanism operable by the means for rotating said work holder to actuate said cam means for feeding motion of said devices, means for imposing more rapid rotation upon said transmission mechanism for actuating said tool feeding devices in rapid traverse motion, and means for automatically disengaging said transmission mechanism from the means for rotating said work holder when said transmission mechanism is being more rapidly rotated.

4. In a lathe, a rotatable work holder, means for rotating said work holder, tool feeding devices operable to feed cutting tools to and from a work piece in said work holder, cam means for actuating said tool feeding devices, non-reversing transmission mechanism operable by the means for rotating said work holder to actuate said cam means for feeding motion of said devices, manual means for rotating said transmission means in either direction, means for automatically disengaging said transmission mechanism from the means for rotating said work holder when said transmission is rotated manually in forward direction, and manual means for disengaging said transmission mechanism from said means for rotating said work holder when said transmission mechanism is manually rotated in reverse direction.

5. In a lathe, a rotatable work holder, means for rotating said work holder, tool feeding devices operable to feed cutting tools to and from a work piece in said work holder, non-reversing transmission mechanism actuated by the means for rotating said work holder to actuate said cam means for feeding motion of said devices, means for imposing more rapid rotation upon said transmission mechanism for actuating said tool feeding devices in rapid traverse motion, means for applying manual rotation to said transmission mechanism, and means to render said means for imposing more rapid rotation upon said transmission mechanism ineffective when said means for manual rotation is applied to said transmission mechanism.

6. In a lathe, a rotatable work holder for supporting and rotating a work piece intermediate its ends, means for supporting the ends of said work piece, means for rotating or arresting rotation of said work holder comprising a source of power for rotating said work holder and a combined clutch and brake mechanism for rendering said source of power effective or ineffective, tool feeding devices operable each side of said work holder and work piece supported therein, cam means for actuating said tool feeding devices, means for actuating said cam means for moving said tool feeding devices at feeding speeds comprising a shaft driven by said means for rotating said work holder and a plurality of cam shafts driven by said first mentioned shaft for actuating said cams, and means for moving said tool feeding devices at rapid traverse speeds comprising a source of power, independent of the source of power for rotating said work holder, connected to and adapted to rotate said first mentioned shaft at a more rapid rate than said shaft is rotated by said means for rotating said work holder, and means for automatically disengaging said first mentioned shaft from said means for rotating said work holder when said source of rapid traverse speeds is operating and for automatically re-engaging said shaft with said means for rotating said work holder when said source of rapid traverse speeds is rendered inoperative.

7. In a lathe, a bed, a carriage longitudinally reciprocatable on said bed, a rotary cam mounted on said bed, means on said carriage to engage said cam whereby said carriage may be longitudinally reciprocated by rotation of said cam, tool slides reciprocatably mounted on said carriage for movement to and from the center line of said lathe, and means operated by said cam means for reciprocating said tool slides comprising a cam plate reciprocatably mounted on said carriage for longitudinal movement relative to the bed of the lathe, means for reciprocating said cam plate by said rotary cam means, and cam means mounted on said tool slides actuated by said cam plate.

8. In a lathe, a rotatable work holder, tool feeding devices operable to and from a work piece in said work holder, a constantly operating source of power for rotating said work holder and operating said tool feeding devices at feeding speeds, a source of power independent of said first mentioned source of power for operating said tool feeding devices at rapid traverse speeds, mechanically operated electrical control means operable by the movement of said tool feeding devices for rendering said source of power for operating said tool feeding devices at rapid traverse speeds effective or ineffective.

9. In a lathe, a rotatable work holder, tool feeding devices operable to and from a work piece in said work holder, a constantly operating source of power for rotating said work holder and operating said tool feeding devices at feeding speeds, manually operable electrical control means for rendering said source of power operative or inoperative, a source of power independent of said first mentioned source of power for operating said tool feeding devices at rapid traverse speeds, mechanically operated electrical control means operable by the movement of said tool feeding devices for rendering said source of power for operating said tool feeding devices at rapid traverse speeds effective or ineffective, and manually operable means for rendering said mechanically operated electrical control means effective or ineffective.

10. In a lathe, a rotatable work holder, tool feeding devices operable to and from a work piece in said work holder, a constantly operating source of power for rotating said work holder and operating said tool feeding devices at feeding speeds, transmission mechanism connecting said constantly operating source of power to said work holder, and tool feeding devices, a manually operated engageable and releasable connection between said source of power and said transmission mechanism, a source of power independent of said first mentioned source of power for operating said tool feeding devices at rapid traverse speeds, and electrical control means operated by the operation of the engageable and releasable connection and the movement of said tool feeding devices to render said last mentioned source of power effective or ineffective.

11. In a lathe, a rotatable work holder, tool feeding devices operable to and from a work piece in said work holder, a constantly operating source of power for rotating said work holder and operating said tool feeding devices at feeding speeds, means for connecting or disconnecting said source of power from said work holder and tool feeding devices, a source of power independent of said first mentioned source of power for operating said tool feeding devices at rapid traverse speeds, means operable by the movement of said tool feeding devices to render said last mentioned source of power operative to rapid traverse said tool feeding devices toward said work piece, means operable by the movement of said tool feeding devices to render said last mentioned source of power operative to rapid traverse said tool feeding devices from said work piece, and means actuated by the operation of said connecting and disconnecting means to alternately render one or the other of said last mentioned means effective.

12. In a lathe, a rotatable work holder, tool feeding devices operable to and from a work piece in said work holder, a constantly operating source of power for rotating said work holder and operating said tool feeding devices at feeding speeds, means for connecting or disconnecting said source of power to said work holder and tool feeding devices, means for holding said connecting and disconnecting means in connected position, means operable by the movement of said tool feeding devices to automatically disconnect said connecting and disconnecting means, independent manually operable means for actuating said connecting and disconnecting means, a source of power independent of said first mentioned source of power for operating said tool feeding devices to rapid traverse speeds, means operable by the movement of said tool feeding devices to render said last mentioned source of power operative to rapid traverse said tool feeding devices toward said work piece, means operable by the movement of said tool feeding devices to render said last mentioned source of power operative to rapid traverse said tool feeding devices from said work piece, and means actuated by the operation of said connecting and disconnecting means to alternately render one or the other of said last mentioned means effective.

13. In a lathe, a rotatable work holder, means for rotating said work holder, tool feeding devices reciprocatable relative to a work piece in said work holder, a single cam means for longitudinally feeding and relieving said tool feeding devices from said work piece, and non-reversing means for rendering said cam means effective.

14. In a lathe, a rotatable work holder, means for rotating said work holder, tool feeding devices reciprocatable relative to a work piece in said work holder, means for longitudinally feeding and relieving said tool feeding devices from said work piece comprising, a cam drum, cam means on said cam drum, and non reversing means for rotating said cam drum.

15. In a lathe, a bed, a rotatable work holder mounted on said bed, means for rotating said work holder, tool feeding devices pivotally mounted on said bed adapted to move cutting tools in arcuate paths relative to a work piece in said work holder, peripheral cams rotatably mounted on said bed, means on said tool feeding devices to engage the periphery of said cams, various differently radially positioned cam surfaces formed on the periphery of said cams for effecting various rates of feeding and dwell for said tool feeding devices, and means for rotating said cams.

16. In a lathe, a bed, a rotatable work holder mounted on said bed, means for rotating said work holder, tool feeding devices pivotally mounted on said bed adapted to move cutting tools in arcuate paths relative to a work piece in said work holder, peripheral cams rotatably mounted on said bed, means on said tool feeding devices to engage the periphery of said cams, various differently radially positioned cam surfaces formed on the periphery of said cams for effecting various different rates of feeding and dwell for each of said tool feeding devices, and means for rotating said cams.

17. In a lathe, a bed, a rotatable work holder mounted on said bed, means for rotating said work holder, tool feeding devices pivotally mounted on said bed adapted to move cutting tools in arcuate paths relative to a work piece in said work holder, peripheral cams rotatably mounted on said bed, means on said tool feeding devices to engage the periphery of said cams, various radially positioned cam surfaces formed on the periphery of said cams for effecting various rates of feeding and dwell for said tool feeding devices, means for rotating said cams at relatively slow speed to cause said feeding and dwell, and means for rapidly rotating said cams to effect a rapid traverse of said tool feeding devices.

WILLIAM F. GROENE.
ROSS M. BACON.